United States Patent
Khanna (10) Patent No.: US 10,212,285 B2
(45) Date of Patent: *Feb. 19, 2019

(54) SYSTEM AND METHOD FOR KEYWORD-BASED NOTIFICATION AND DELIVERY OF CONTENT

(71) Applicant: Avaya Inc., Basking Ridge, NJ (US)

(72) Inventor: Varun Khanna, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 39 days.

This patent is subject to a terminal disclaimer.

(21) Appl. No.: 15/007,286

(22) Filed: Jan. 27, 2016

(65) Prior Publication Data

US 2016/0142546 A1    May 19, 2016

Related U.S. Application Data

(63) Continuation of application No. 13/859,111, filed on Apr. 9, 2013, now Pat. No. 9,300,718.

(51) Int. Cl.

| | |
|---|---|
| G06F 15/16 | (2006.01) |
| H04M 3/51 | (2006.01) |
| H04L 29/08 | (2006.01) |
| H04M 3/00 | (2006.01) |
| G06F 17/27 | (2006.01) |

(Continued)

(52) U.S. Cl.
CPC ...... *H04M 3/5191* (2013.01); *G06F 17/2765* (2013.01); *G10L 15/183* (2013.01);
(Continued)

(58) Field of Classification Search
CPC ............. H04M 3/4936; H04M 3/5191; H04M 2201/40
See application file for complete search history.

(56) References Cited

U.S. PATENT DOCUMENTS

| | | | |
|---|---|---|---|
| 7,457,404 B1 | 11/2008 | Hession et al. | |
| 7,672,845 B2 * | 3/2010 | Beranek | H04M 3/51 379/265.09 |

(Continued)

OTHER PUBLICATIONS

Meky, Moustafa M.; Office Action; U.S. Appl. No. 13/859,111; dated May 12, 2015; United States Patent and Trademark Office; Alexandria, Virginia.

(Continued)

*Primary Examiner* — Moustafa M Meky
(74) *Attorney, Agent, or Firm* — Stevens & Showalter, LLP (57) ABSTRACT

Providing keyword-based notification and content includes monitoring, a communication interface, the communication interface configured to transport a communication between an agent communication device and a user communication device; recognizing an occurrence of a keyword in the communication; wherein the keyword is stored in a database; and retrieving from the database, an information related to the keyword, wherein the database comprises: a first memory area configured to store a mapping of keywords to keyword information; and a second memory area configured to store a mapping of a user identifier associated with a user to information related to how keyword information should be delivered to the user associated with the user identifier. Ultimately the information related to the keyword is transmitted to one of the agent communication device or the user communication device.

19 Claims, 5 Drawing Sheets

(51) Int. Cl.
*G10L 15/183* (2013.01)
*G10L 15/26* (2006.01)
*H04M 3/42* (2006.01)
*H04M 3/493* (2006.01)
*G06Q 90/00* (2006.01)
*G10L 15/08* (2006.01)

(52) U.S. Cl.
CPC ............ *G10L 15/265* (2013.01); *H04L 67/02* (2013.01); *H04M 3/00* (2013.01); *H04M 3/42221* (2013.01); *H04M 3/4936* (2013.01); *H04M 3/51* (2013.01); *G06Q 90/00* (2013.01); *G10L 2015/088* (2013.01); *H04M 2201/40* (2013.01); *H04M 2203/2038* (2013.01)

(56) References Cited

U.S. PATENT DOCUMENTS

| | | | |
|---|---|---|---|
| 7,899,698 B2 | 3/2011 | Wan et al. | |
| 8,078,471 B2* | 12/2011 | Geisel | G01G 19/4144 704/251 |
| 8,649,499 B1* | 2/2014 | Koster | H04M 3/5175 379/265.06 |
| 8,918,803 B2* | 12/2014 | Bangalore | H04N 21/4884 725/112 |
| 2003/0208472 A1 | 11/2003 | Pham | |
| 2007/0249406 A1* | 10/2007 | Andreasson | H04M 1/656 455/563 |
| 2008/0195659 A1 | 8/2008 | Rawle | |
| 2008/0294438 A1* | 11/2008 | Geisel | G01G 19/4144 704/251 |
| 2009/0094230 A1* | 4/2009 | Sakata | H04N 7/17318 |
| 2011/0321098 A1* | 12/2011 | Bangalore | H04N 21/4884 725/46 |

OTHER PUBLICATIONS

Meky, Moustafa M.; Notice of Allowance; U.S. Appl. No. 13/859,111; dated Oct. 15, 2015; United States Patent and Trademark Office; Alexandria, Virginia.

* cited by examiner

| Index1 (312) | Keyword (314) | Keyword Information (316) |
|---|---|---|
| 00000001 | Activate GPRS | Detailed steps on how GPRS can be activated on a device |
| 00000002 | Plan Detail | Details of cell phone plan in discussion |
| 00000003 | | |
| ⋮ | ⋮ | ⋮ |
| FFFFFFFE | | |
| FFFFFFFF | | |

320

| Index2 (322) | Acct / User ID (324) | Device for Receiving Keyword Information (326) |
|---|---|---|
| 00000001 | John | Mobile - SMS |
| 00000002 | Marc | Email |
| ⋮ | ⋮ | ⋮ |
| FFFFFFFE | | |
| FFFFFFFF | | |

SYSTEM AND METHOD FOR KEYWORD-BASED NOTIFICATION AND DELIVERY OF CONTENT

CROSS-REFERENCE TO RELATED APPLICATIONS

This application is a continuation of U.S. patent application Ser. No. 13/859,111, filed Apr. 9, 2013, the disclosure of which is hereby incorporated by reference in its entirety.

BACKGROUND

Field of the Invention

Embodiments of the present invention generally relate to communication between a customer and a contact center, and, in particular, to a system and method for recognizing and using keywords to provide additional contextual information to a call participant.

Description of Related Art

Effective communication between an agent at a contact center and a customer often can be difficult if the agent and customer have language or cognition barriers. For example:

i) Customer retention of spoken information: A customer sometimes cannot completely remember details of a problem or solution that are spoken by an agent. For example, the customer may be traveling or is distracted during the call, and/or does not have a writing instrument to take notes, etc. This may result in another call to the contact center, or the customer may perform an incorrect action (or fail to perform a correct action) because the customer incorrectly remembered information, and so forth.

ii) The customer or agent may lack comprehension of keywords, new product names, other technical language, and so forth. The agent and/or customer may have highly different levels of technical sophistication, or the customer is mistaken in their understanding of what the agent said, etc. For example, senior citizens who are not well-versed with the latest technologies may have difficulty expressing the nature of a problem, and/or may have difficulty understanding explanations or corrective action spoken by an agent. The technical words spoken during the call can be difficult to hear for persons with hearing problems, and difficult to understand without a base level of technical understanding. These difficulties may result in frustration by the customer. For example, steps regarding how to set up or use WI-FI may involve navigating to certain menus or options (e.g., WEP security) which may result in confusion if the customer is not familiar with the technology. The customer may be using a handset during the call that is not conducive to multitasking or to navigating to web sites that provide background information.

iii) The customer and/or agent may lack sufficient fluency in a mutual language in order to effectively describe or understand a problem or a solution. For example, an agent may speak too fast, or may have an accent that makes it hard for a customer to understand the content spoken. Data, diagnosis, instructions, etc. wrongly understood by a customer may result in serious dissatisfaction by the customer. For example, a wrongly understood last payment date for a bill payment may result in an unexpected fee to the customer and result in dissatisfaction with the level of service.

Thus, a need exists to mitigate the shortcomings of the known art identified above.

SUMMARY

One aspect of the present disclosure relates to a computer-implemented method to provide keyword-based notification and content that includes monitoring, by a processor, a communication interface, the communication interface configured to transport a communication between an agent communication device and a user communication device; recognizing, by the processor, an occurrence of a keyword in the communication; wherein the keyword is stored in a database in communication with the processor; and determining, by the processor, whether an information associated with the keyword is stored in the database. When the information associated with the keyword is stored in the database the method continues with retrieving, by the processor from the database, the information associated with the keyword; and transmitting, by the processor, to one of the agent communication device or the user communication device the information associated with the keyword. However, when the information associated with the keyword is not stored in the database, the method continues with searching, by the processor, a source of information other than the database for first alternative information associated with the keyword; retrieving, by the processor, the first alternative information from the source of information other than the database; and transmitting, by the processor, to one of the agent communication device or the user communication device the first alternative information associated with the keyword.

Another aspect of the present disclosure relates to a system within an enterprise to provide keyword-based notification and content that includes a memory device storing executable instructions and a processor in communication with memory device. The processor when executing the executable instructions: monitors a communication interface, wherein the communication interface is configured to transport a communication between an agent device and a user device; recognizes an occurrence of a keyword in the communication; wherein the keyword is stored in a database in communication with the processor. The processor also determines whether an information associated with the keyword is stored in the database. When the information associated with the keyword is stored in the database the processor retrieves from the database, the information associated with the keyword; and transmits to one of the agent device or the user device the information associated with the keyword. When the information associated with the keyword is not stored in the database, the processor searches a source of information other than the database for first alternative information associated with the keyword; retrieves the first alternative information from the source of information other than the database; and transmits to one of the agent communication device or the user communication device the first alternative information associated with the keyword.

Yet another aspect of the present disclosure relates to a computer-implemented method to provide keyword-based notification and content. The method includes monitoring, by a processor, a communication interface, the communication interface configured to transport a communication between an agent communication device and a user communication device; and recognizing, by the processor, an occurrence of a keyword in the communication; wherein the keyword is stored in a database in communication with the processor. The method also includes retrieving, by the processor from the database, an information related to the keyword, wherein the database comprises: a first memory area configured to store a mapping of keywords to keyword information; and a second memory area configured to store a mapping of a user identifier associated with a user to information related to how keyword information should be delivered to the user associated with the user identifier. The processor also transmits to one of the agent and the user the information related to the keyword.

An additional aspect of the present disclosure relates to a system within an enterprise to provide keyword-based notification and content that includes a memory device storing executable instructions and a processor in communication with memory device. The processor when executing the executable instructions a) monitors a communication interface, wherein the communication interface is configured to transport a communication between an agent device and a user device; b) recognizes an occurrence of a keyword in the communication; wherein the keyword is stored in a database in communication with the processor; c) retrieves from the database, an information related to the keyword, wherein the database comprises: a first memory area configured to store a mapping of keywords to keyword information; and a second memory area configured to store a mapping of a user identifier associated with a user to information related to how keyword information should be delivered to the user associated with the user identifier. The processor also transmits to one of the agent and the user the information related to the keyword.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize keyword recognition to provide further information on demand.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein in connection with embodiments of the present invention, the term "contact" (as in "customer contact") refers to a communication from a customer or potential customer, in which a request is presented to a contact center. The request can be by way of any communication medium such as, but not limited to, a telephone call, e-mail, instant message, web chat, and the like.

As used herein in connection with embodiments of the present invention, the term "customer" denotes a party external to the contact center irrespective of whether or not that party is a "customer" in the sense of having a commercial relationship with the contact center or with a business represented by the contact center. "Customer" is thus shorthand, as used in contact center terminology, for the other party to a contact or a communications session.

As used herein in connection with embodiments of the present invention, the term "empower" refers to an ability by a party (e.g., a customer) to exercise rights, abilities, functions and so forth, which had been formerly and exclusively reserved for exercise by another party (e.g., a service agent).

The terms "switch," "server," "contact center server," or "contact center computer server" as used herein should be understood to include a Private Branch Exchange ("PBX"), an Automated Contact Distribution ("ACD") system, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting a signal. As used herein, the term "receiver" may generally comprise any device, circuit, or apparatus capable of receiving a signal. As used herein, the term "transceiver" may generally comprise any device, circuit, or apparatus capable of transmitting and receiving a signal. As used herein, the term "signal" may include one or more of an electrical signal, a radio signal, an optical signal, an acoustic signal, and so forth.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

One or more embodiments of the present invention may utilize Session Initiation Protocol (SIP) as a communication protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communication sessions. Examples of the types of communication sessions that may be established using SIP include voice, video, and/or instant messaging. SIP also facilitates peer-to-peer communication sessions. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

Users or any other addressable entities in a SIP framework are identified by Universal Resource Identifiers (URI). Each such Internet-style address (for example, sip:johndoe@avaya.com) maps into one or more Contacts, each of which typically represents a device or service at which the corresponding user may be reached. Examples are phones, desktop multimedia clients, instant message accounts, email accounts and so on. The SIP framework is responsible for routing a request for a peer-to-peer session addressed to a given URL to one or more appropriate contacts for that URL. The framework may utilize information about the preferences, presence and location of the user identified by the URL, to determine the most appropriate contacts. The protocol also provides mechanisms to specify the type of session that is requested as well as means to change session parameters.

SIP is not a vertically integrated communications system. SIP is rather a component that can be used with other IETF protocols to build a complete multimedia architecture. Typically, these architectures will include protocols such as RTP (RFC 3550) for transporting real-time data and providing QoS feedback, the Real-Time streaming protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 2327) for describing multimedia sessions. Therefore, SIP should be used in conjunction with other protocols in order to provide complete services to the users. However, the basic functionality and operation of SIP does not depend on any of these protocols.

The Real-Time Transport Control Protocol ("RTCP") is a protocol that is known and described in Internet Engineering Task Force (IETF) Request For Comment RFC 3550. RTCP provides out-of-band statistics and control information for an RTP media stream. It is associated with RTP in the delivery and packaging of a media stream, but does not transport the media stream itself. Typically RTP will be sent on an even-numbered UDP port, with RTCP messages being sent over the next higher odd-numbered port. RTCP may be used to provide feedback on the quality of service ("QoS") in media distribution by periodically sending statistics information to participants in a streaming multimedia session. Systems implementing RTCP gather statistics for a media connection and information such as transmitted octet and packet counts, lost packet counts, jitter, and round-trip delay time. An application program may use this information to control quality of service parameters, for instance by limiting a flow rate or by using a different codec.

Figure 1:
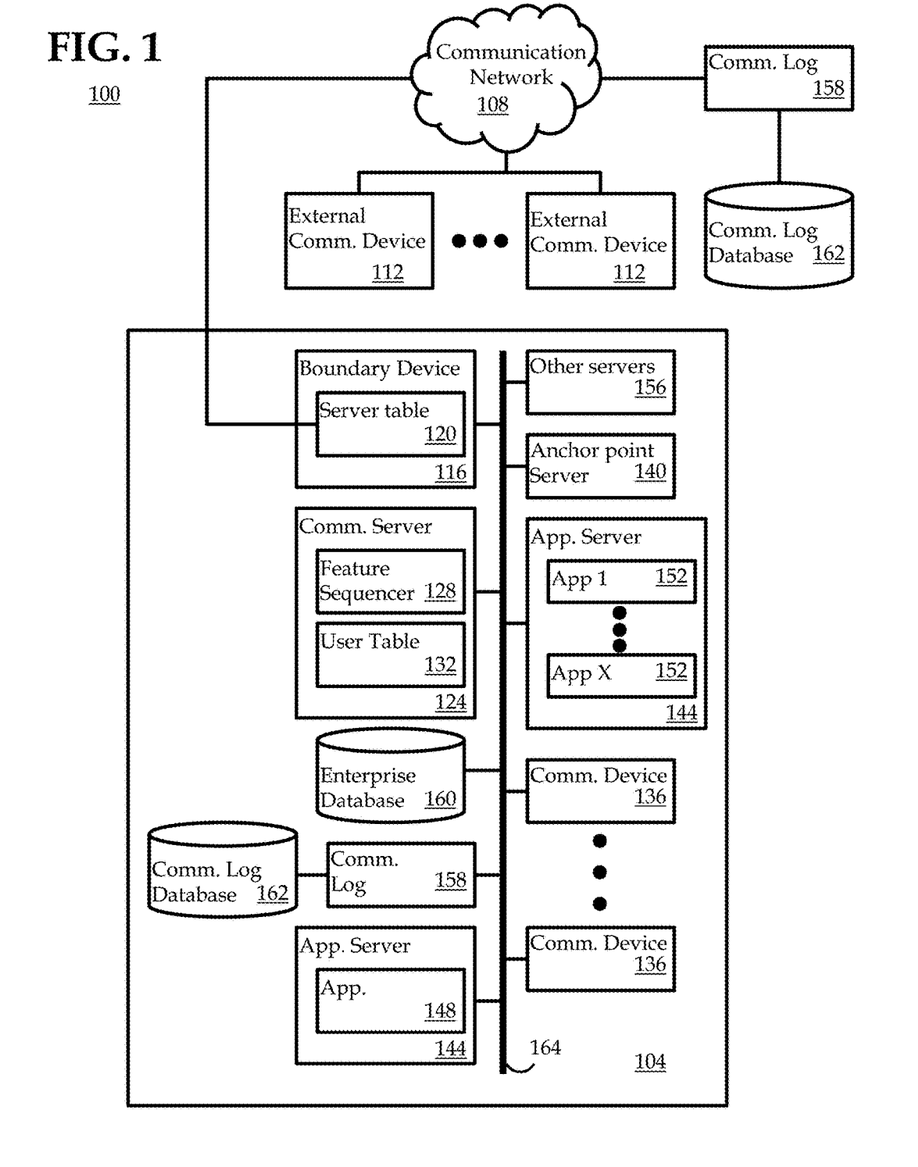
FIG. 1 is a block diagram depicting a system in accordance with an embodiment of the present invention.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112. The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, an anchor point server 140, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof. Embodiments herein may refer to communication server 124 generically as a "session manager" for ease of reference.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and services a first subset of enterprise users whereas a second communications server 124 may be authoritative for and services a second subset of enterprise users, where the first and second subsets of users generally do not share a common user. This is one reason why the network boundary device 116 may be provided with a server table 120.

Additionally, multiple servers 124 can support a common user community. For example, in geo-redundant configurations and other applications where users aren't necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but it is not necessarily required that the server be the same. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 includes a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features should be incorporated into a communication session for the user. The feature sequencer 128 can actually provide communication features directly into the communication session or the feature sequencer 128 can determine an application sequence which will be invoked during set-up and used during the communication session.

In accordance with at least some embodiments, the feature sequencer 128 can determine an application sequence and cause one or more applications 148, 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, the process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multimedia communications are established and conducted.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

Referring to the system of FIG. 1, a contact center may include enterprise network 104. An agent of the contact center may use one of communication devices 136 in order to communicate with a customer over communication network 108. The customer may be using one of external communication devices 112.

A system in accordance with an embodiment of the present invention may include a database 160 that includes nonvolatile storage of keywords to be recognized by a recognition process. As used herein, a "keyword" may include a word or a relatively short phrase. The recognition process may be stored as processor instructions, with the instructions stored in a memory such as database 160, such that when the instructions are carried out, e.g., as application 148 executing on a dedicated server 144, or as application 152 executing on a shared server 144, the recognition process is performed.

Figure 2:
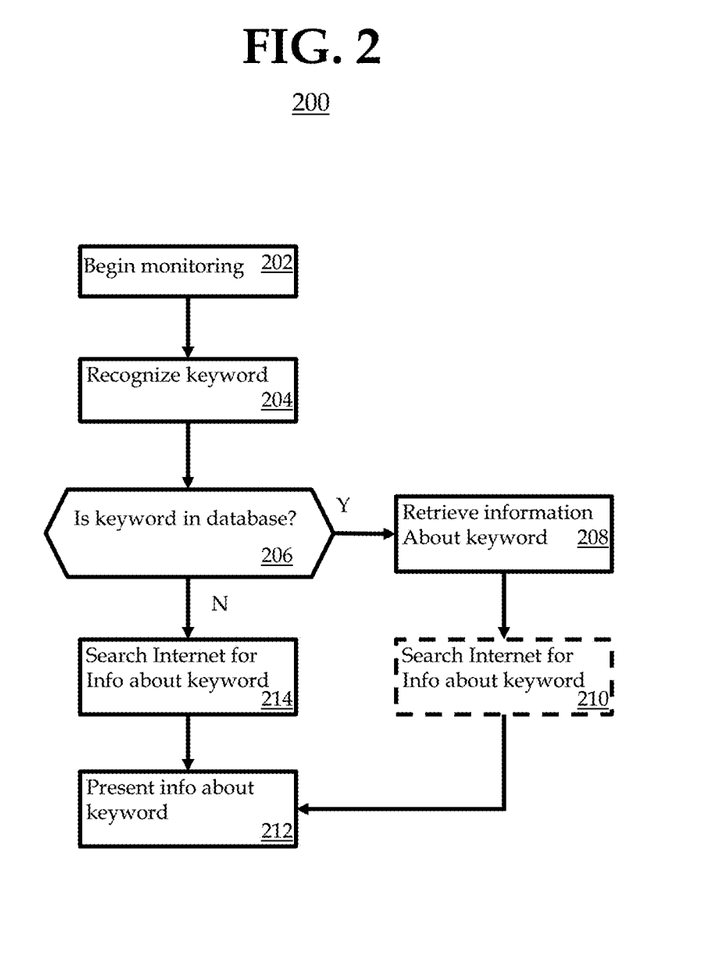
FIG. 2 illustrates at a high level of abstraction a process in accordance with an embodiment of the present invention.

FIG. 2 illustrates a process 200 in accordance with an embodiment of the present invention. Process 200 may be used for keyword processing. Process 200 begins at step 202, at which monitoring of a communication between an agent and a customer is established. The monitoring may be performed by a processor within the contact center (e.g., server 144) or by a processor in communication with the contact center. Control of process 200 transitions to step 204.

At step 204, a keyword may be recognized in the communication monitored beginning at step 202. The recognition may include audio recognition of spoken keywords, textual recognition of keywords in written communication, textual recognition of keywords in an audio communication that has been converted or transcribed into written form, or substantially any combination of such methods. A keyword dictionary may be useful to carry out step 204. Communication from the agent to the customer may be monitored in order to recognize keywords used by the agent and responsively to present related information (or links to such information) to the customer. Conversely, communication from the customer to the agent may be monitored in order to recognize keywords used by the customer and responsively to present related information (or links to such information) to the agent.

Alternatively, grammar syntax rules or other language recognition techniques may be used to identify nouns and/or verbs as candidate keywords, including unrecognized words or phrases. Such unrecognized words or phrases may become future keywords, e.g.: by use of a module configured to allow an agent or system administrator to review and approve; or if the unrecognized words or phrases are detected within multiple communications with customers, by processor-implemented methods, more than a predetermined number of times and optionally within a predetermined time period.

Next, control of process 200 transitions to step 206, at which database 160 may be queried to determine whether it contains further information about the keyword. Database 160 may be pre-programmed with keywords for a predetermined technology, industry, customer profile, type of transaction, and the like. For example, pre-programmed keywords may include "Last Payment Date," "Last Transaction," and so forth. The further information may be static in the form of a text file, an audio/video content, a word processing document, a PowerPoint presentation, etc., or dynamic as in the result of a result of a child process, a URL, etc. Static information may include information that is the same for substantially all customers having substantially the same circumstances and query, e.g. "Activate GPRS." Dynamic information may be specific to an individual customer such as "Last Transaction Date." A child process may include, e.g., an ActiveX process that queries another system and/or database to obtain account-specific or time-specific data such as account history, account terms and conditions, special offers, and so forth.

Alternatively, the contact center may include a module or an interface that is configured to allow an agent to submit new keywords such as new words or phrases encountered more than once by the agent. For example, if customers frequently call up a contact center to get information about how to "activate GPRS," the contact center may store the phrase "activate GPRS" as a new keyword in database 160.

If the result of decision step 206 is positive, then control of process 200 passes to step 208. If the result of decision step 206 is negative, then control of process 200 passes to step 214.

At step 208, information about the keyword is retrieved from database 160. For example, static information may be retrieved or an active process may be performed to retrieve dynamic information. Depending on the usage context there may be more than alternative sets of information about the keyword (e.g., alternative definitions or acronym meanings). In some embodiments, all such alternative sets of information may be retrieved. In other embodiments, the alternative sets of information may be presented based upon the context of the monitored communication. Presentation may include filtering the list, sorting, highlighting, etc. Control of process 200 may then transitions to optional step 210. If optional step 210 is not performed, then control of process 200 passes to step 212.

At optional step 210, alternative sources of information such as the internet may be searched. Such searching may be useful if it is deemed that the information in database 160 is insufficient in some way, e.g., not enough information, stale information, and so forth. The information retrieved from alternative sources may be filtered for relevance and indicia of trustworthiness, e.g., cross-checked for accuracy where possible, credibility of sources, multiplicity of independent sources, etc. Sufficiently relevant and trustworthy information may be added to database 160. Upon completion of step 210, control of process 200 passes to step 212.

At step 214, alternative sources of information such as the internet may be searched. Such a search may be particularly useful if database 160 does not contain the keyword. Step 214 proceeds substantially the same as step 210. Upon completion of step 214, control of process 200 passes to step 212.

At step 212, information retrieved from database 160 and/or information retrieved from alternative sources may be presented to the customer and/or the agent. Alternatively, abbreviated information, or instructions or a link (including command button, hotspot, shortcut key, or the like) for accessing the information, may be sent instead of or in addition to the information itself. For example, an abbreviated summary of the information may be sent, along with a link to the full information. The information may include some alternative sets of information for selection based on contextual relevance. The information may be presented to the recipient via one or more channels. For example, the information may be delivered by email, SMS text messages, instant messaging, popup windows, popup balloon, tooltip, hyperlinks in messages, and so forth. The information may be delivered by a different channel than a channel used for the communication between the agent and customer. For example, the communication between the agent and customer may be over a voice channel, but information may be presented to the customer via text messaging. Properties or options controllable by the user may include certain configurations of the messaging and/or its delivery.

In some embodiments in which a conversation includes numerous detected keywords that would otherwise fill up and/or scroll off a user's screen, a system may provide to a customer a transcript of the entire session rather than real-time notification of keywords as they are detected. A customer interface may be used to configure whether a transcript should be provided. The transcript may contain hyperlinked keywords. If the customer desires further information about a keyword, the customer may click on the respective hyperlink. Further information will then be retrieved by the system and presented to the customer.

Figure 3:
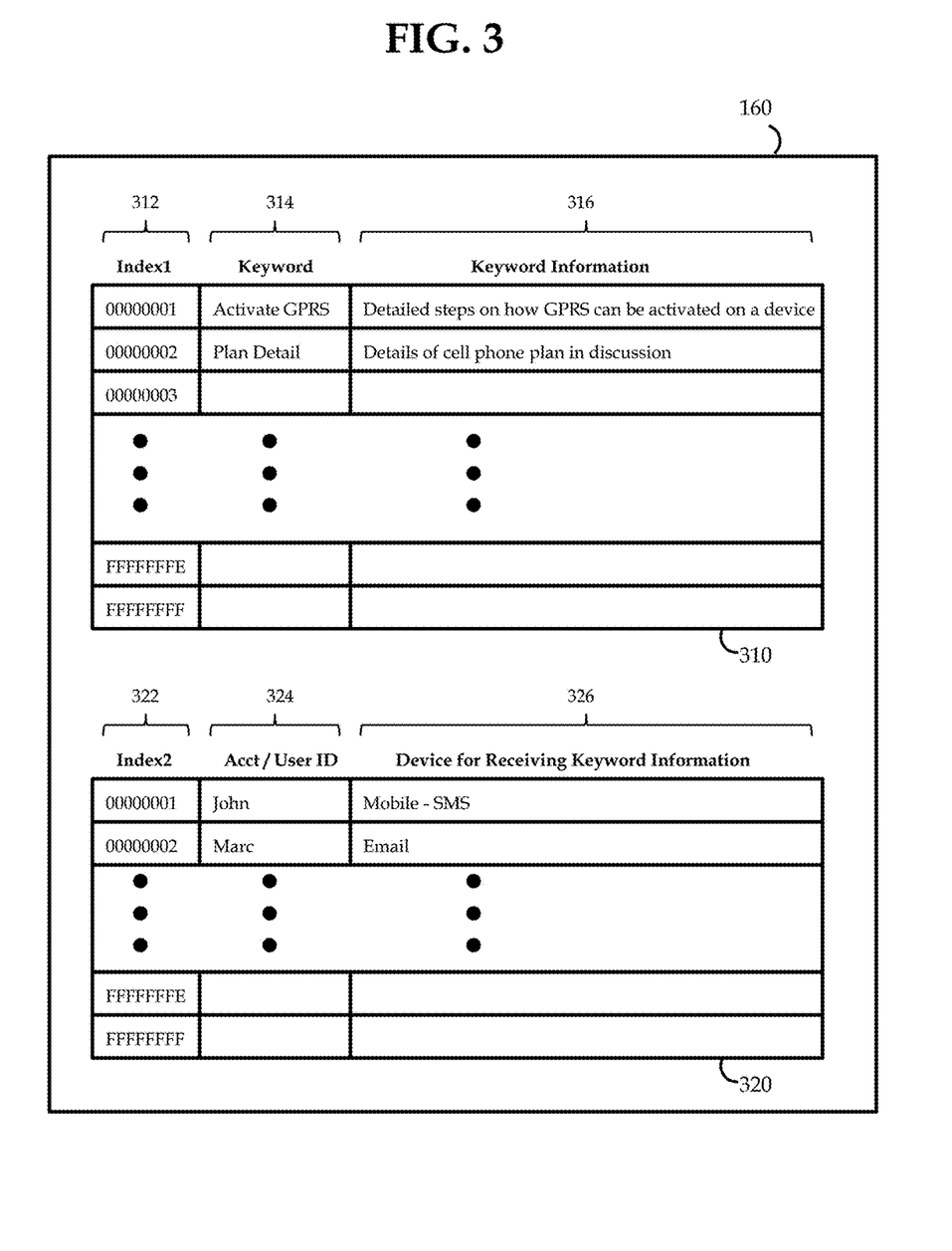
FIG. 3 illustrates at a high level of abstraction a layout of a database storable in a nonvolatile memory in accordance with an embodiment of the present invention.

FIG. 3 illustrates a layout of database 160 in accordance with an embodiment of the present invention. Database 160 may include information related to available and/or preferred notification channels for agents and/or customers. Database 160 may include a first memory area 310 configured to store a mapping of keywords 314 to keyword information 316. First memory area 310 may further include an index field 312 that uniquely identifies a record in first memory area 310.

Database 160 may further include a second memory area 320 configured to store a mapping of identifiers 324 (e.g., account number, user ID, etc.) to information 326 related to how keyword information should be delivered to the respective user associated with identifier 324. Second memory area 320 may further include an index field 322 that uniquely identifies a record in second memory area 320.

Figure 4:
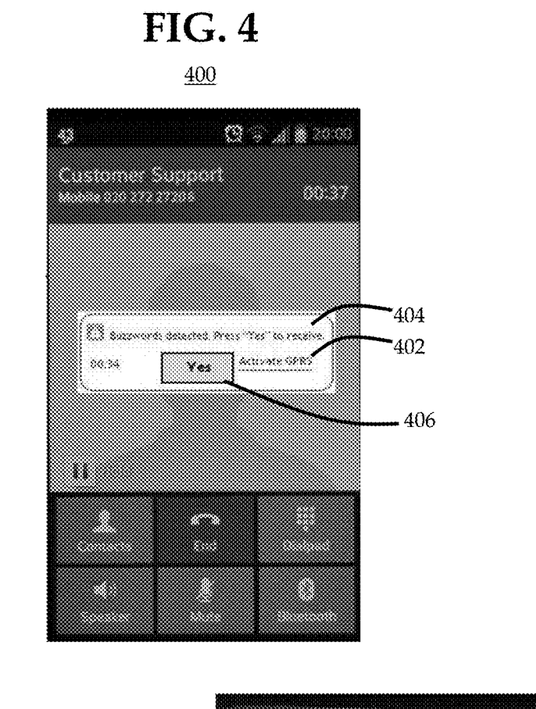
FIG. 4 illustrates a first exemplary user interface, in accordance with an embodiment of the present invention.

FIG. 4 illustrates a user interface 400 in accordance with an embodiment of the present invention. Interface 400 depicts a point during a call between an agent and a customer, in which the customer is using a smart phone, and a "buzzword" (i.e., a keyword) was detected during the call. Interface 400 may include an indication 402 of the detected keyword, instructions 404 for accessing further information, and/or a command button 406 used to retrieve the available further information.

Figure 5:
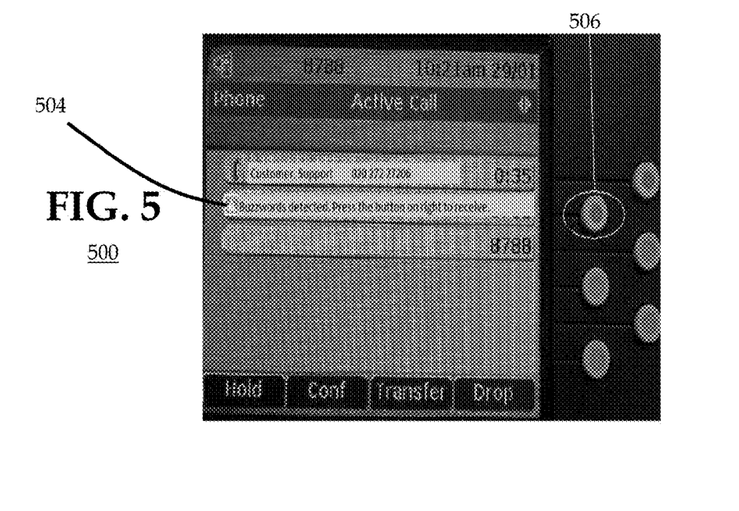
FIG. 5 illustrates a second exemplary user interface, in accordance with an embodiment of the present invention.

FIG. 5 illustrates a user interface 500 in accordance with an embodiment of the present invention. Interface 500 depicts a point during a call between an agent and a customer, in which the customer is using a desktop phone with a video display, and a "buzzword" (i.e., a keyword) was detected during the call. Interface 500 may include instructions 504 for accessing further information. Softkeys or programmable buttons 506 available on the desktop phone may be programmed and used to retrieve the available further information.

Figure 6:
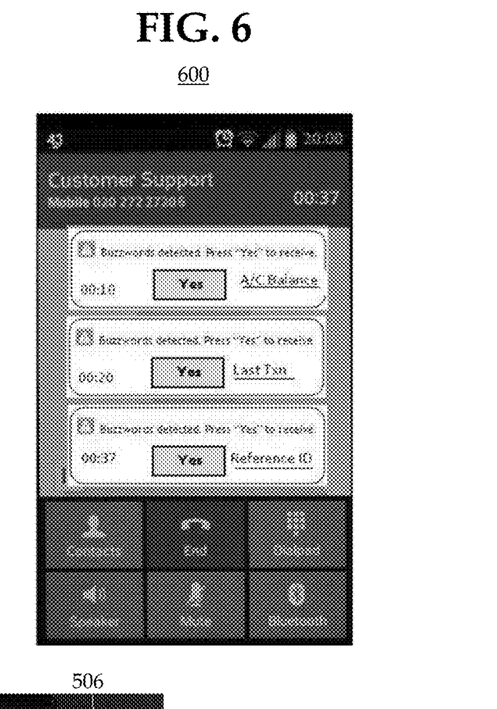
FIG. 6 illustrates a third exemplary user interface, in accordance with an embodiment of the present invention.

FIG. 6 illustrates a user interface 600 in accordance with an embodiment of the present invention. Interface 600 is similar to interface 400, in that interface 600 depicts a point during a call between an agent and a customer, in which the customer is using a smart phone. However, in interface 600, multiple "buzzwords" (i.e., keywords) have been detected during the call. Information about the detected keywords is displayed on the smart phone for further action by the user. Interface 600 includes indications, instructions, and/or command buttons similar to that of interface 400.

Figure 7:
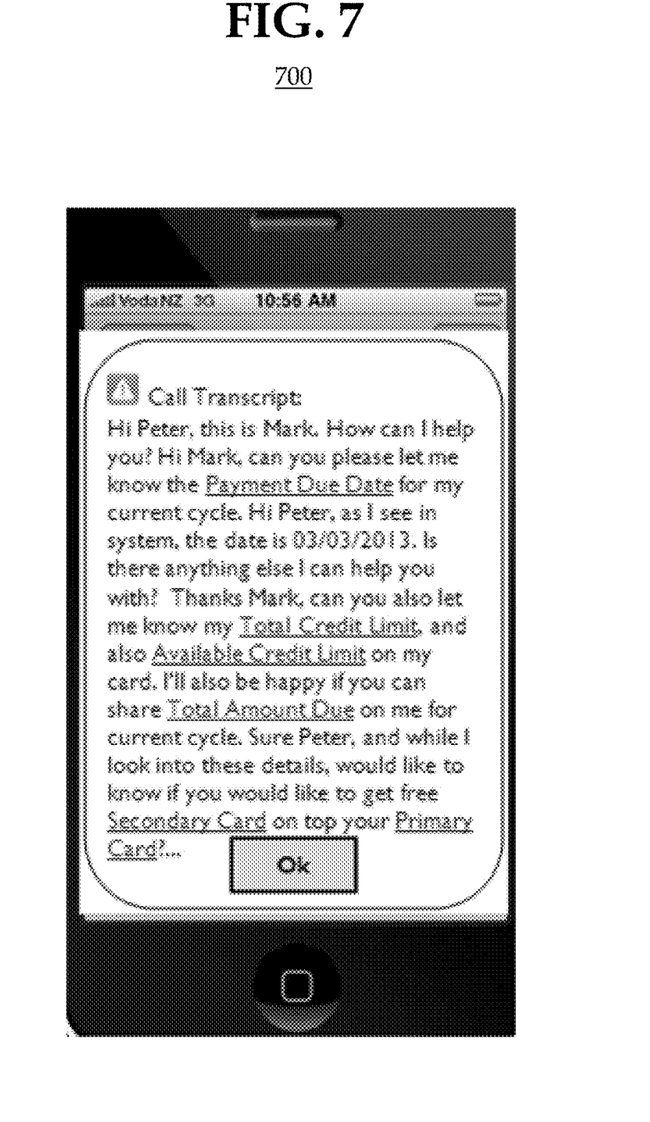
FIG. 7 illustrates a hyperlinked transcript in accordance with an embodiment of the present invention.

FIG. 7 illustrates a hyperlinked transcript in accordance with an embodiment of the present invention. Standard user controls may be provided to scroll through the transcript.

Embodiments of the present invention include a system having one or more processing units coupled to one or more memories. The one or more memories may be configured to store software that, when executed by the one or more processing unit, allows practice of the embodiments described herein, at least by use of processes described herein, including at least in FIG. 2 and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

What is claimed is:

1. A computer-implemented method to provide keyword-based notification and content, comprising:
monitoring, by a processor, a communication interface, the communication interface configured to transport a communication between an agent communication device and a user communication device;
recognizing, by the processor, an occurrence of a keyword in the communication, wherein the keyword is stored in a database in communication with the processor, wherein the database comprises a non-volatile data storage;
determining, by the processor, whether an information associated with the keyword is stored in the database;
when the information associated with the keyword is stored in the database:
retrieving, by the processor from the database, the information associated with the keyword; and
transmitting, by the processor, to one of the agent communication device or the user communication device the information associated with the keyword; and
when the information associated with the keyword is not stored in the database:
searching, by the processor, a source of information other than the database for first alternative information associated with the keyword;
retrieving, by the processor, the first alternative information from the source of information other than the database;
adding, by the processor, the first alternative information to the database; and
transmitting, by the processor, to one of the agent communication device or the user communication device the first alternative information associated with the keyword.

2. The method of claim 1, wherein recognizing an occurrence of a keyword in the communication comprises voice recognition of a spoken communication.

3. The method of claim 1, wherein recognizing an occurrence of a keyword in the communication comprises textual recognition of a written communication.

4. The method of claim 1, comprising:
when the information associated with the keyword is stored in the database:
determining, by the processor, whether additional information associated with the keyword is stored in the database;
retrieving, by the processor, from the database, the additional information associated with the keyword; and
transmitting, by the processor, to one of the agent communication device or the user communication device the additional information associated with the keyword.

5. The method of claim 4, wherein the additional information comprises dynamic data related to an account associated with the user communication device.

6. The method of claim 1, comprising:
when the information associated with the keyword is stored in the database:
searching, by the processor, the source of information other than the database for second alternative information associated with the keyword;
retrieving, by the processor, the second alternative information from the source of information other than the database; and
transmitting, by the processor, to one of the agent communication device or the user communication device the second alternative information associated with the keyword.

7. The method of claim 6, further comprising:
filtering, by the processor, the second alternative information based on an indicia of trustworthiness associated with the second alternative information.

8. The method of claim 1, wherein the information transmitted to one of the agent communication device or the user communication device comprises a plurality of alternative sets of information.

9. The method of claim 1, further comprising:
providing, by a processor, a transcript of an entirety of the communication to the user communication device, wherein the transcript comprises hyperlinked keywords.

10. The method of claim 1, wherein the database comprises:
a first memory area configured to store a mapping of keywords to keyword information; and
a second memory area configured to store a mapping of a user identifier associated with a user to information related to how keyword information should be delivered to the user associated with that user identifier.

11. A system within an enterprise to provide keyword-based notification and content, comprising:
a memory device storing executable instructions;
a processor in communication with the memory device, the processor when executing the executable instructions:
monitors a communication interface, wherein the communication interface is configured to transport a communication between an agent device and a user device;
recognizes an occurrence of a keyword in the communication, wherein the keyword is stored in a database in communication with the processor, wherein the database comprises a non-volatile data storage;
determines whether an information associated with the keyword is stored in the database;
when the information associated with the keyword is stored in the database:
retrieves from the database, the information associated with the keyword; and
transmits to one of the agent device or the user device the information associated with the keyword;
when the information associated with the keyword is not stored in the database:
searches a source of information other than the database for first alternative information associated with the keyword;
retrieves the first alternative information from the source of information other than the database;
adds the first alternative information to the database; and
transmits to one of the agent device or the user device the first alternative information associated with the keyword.

12. The system of claim 11, wherein the communication comprises an audio communication and the processor when executing the executable instructions performs voice recognition on the audio communication.

13. The system of claim 11, wherein when the information associated with the keyword is stored in the database, the processor when executing the executable instructions:
searches the source of information other than the database for second alternative information associated with the keyword;
retrieves the second alternative information from the source of information other than the database; and
transmits to one of the agent device or the user device the second alternative information associated with the keyword.

14. The system of claim 13, wherein the processor when executing the executable instructions filters the second alternative information based on an indicia of trustworthiness.

15. The system of claim 11, wherein the database comprises:
a first memory area configured to store a mapping of keywords to keyword information; and
a second memory area configured to store a mapping of a user identifier associated with a user to information related to how keyword information should be delivered to the user associated with that user identifier.

16. A system within an enterprise to provide keyword-based notification and content, comprising:
a memory device storing executable instructions;
a processor in communication with the memory device, the processor when executing the executable instructions:
monitors a communication interface, wherein the communication interface is configured to transport a communication between an agent device and a user device;
recognizes an occurrence of a keyword in the communication, wherein the keyword is stored in a database in communication with the processor;
retrieves from the database, an information related to the keyword, wherein the database comprises:
a first memory area configured to store a mapping of keywords to keyword information; and
a second memory area configured to store a mapping of a user identifier associated with a user to information related to how keyword information should be delivered to the user associated with the user identifier; and
transmits to one of the agent device or the user device the information related to the keyword.

17. The system of claim 16, wherein the communication comprises an audio communication and the processor when executing the executable instructions performs voice recognition on the audio communication.

18. The system of claim 16, wherein the communication comprises a written communication and the processor when executing the executable instructions performs textual recognition of the written communication.

19. The system of claim 16, wherein the communication comprises a transcribed spoken communication and the processor when executing the executable instructions performs textual recognition of the transcribed spoken communication.

* * * * *